(12) United States Patent
Liu et al.

(10) Patent No.: US 10,536,430 B2
(45) Date of Patent: Jan. 14, 2020

(54) IP ADDRESS ACQUISITION METHOD AND APPARATUS

(71) Applicant: Alibaba Group Holding Limited, George Town (KY)

(72) Inventors: Jianye Liu, Hangzhou (CN); Peng Zheng, Hangzhou (CN); Caiwei Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 14 days.

(21) Appl. No.: 15/974,360

(22) Filed: May 8, 2018

(65) Prior Publication Data
US 2018/0255018 A1    Sep. 6, 2018

Related U.S. Application Data (63) Continuation of application No. PCT/CN2016/104306, filed on Nov. 2, 2016.

(30) Foreign Application Priority Data

Nov. 11, 2015   (CN) .......................... 2015 1 0764761

(51) Int. Cl.
*H04W 12/08* (2009.01)
*H04L 29/12* (2006.01)
(Continued)

(52) U.S. Cl.
CPC ...... *H04L 61/2007* (2013.01); *H04L 61/2046* (2013.01); *H04L 63/029* (2013.01);
(Continued)

(58) Field of Classification Search
CPC . H04L 29/12; H04L 61/2007; H04L 61/2046; H04L 63/029; H04L 63/1441;
(Continued)

(56) References Cited

U.S. PATENT DOCUMENTS

2010/0107225 A1*  4/2010  Spencer .............. H04L 63/0876
                                                        726/4
2010/0161535 A1*  6/2010  Sen ................... H04L 29/12273
                                                        706/46

(Continued)

FOREIGN PATENT DOCUMENTS

| CN | 101132278 | 2/2008 |
|----|-----------|--------|
| WO | 2015069165 | 5/2015 |

OTHER PUBLICATIONS

Extended European Search Report issued in EP Application No. 16863570.4 dated Aug. 27, 2018; 10 pages.
(Continued)

*Primary Examiner* — Robert J Lopata
(74) *Attorney, Agent, or Firm* — Fish & Richardson P.C.

(57) ABSTRACT

A request message requesting a service is received from a terminal device. Computer code is transmitted to the terminal device, and a communication connection request is received from the terminal device in response to running the computer code on the terminal device. In response to receiving the communication connection request, a communication connection is established to the terminal device. A first IP address associated with the terminal device is determined based on one or more communications transmitted through the communication connection.

17 Claims, 6 Drawing Sheets (51) Int. Cl.
*H04L 29/08* (2006.01)
*H04L 29/06* (2006.01)
*H04W 88/16* (2009.01)

(52) U.S. Cl.
CPC .............. *H04L 67/02* (2013.01); *H04L 69/16* (2013.01); *H04W 12/08* (2013.01); *H04W 88/16* (2013.01)

(58) Field of Classification Search
CPC ... H04L 65/608; H04L 67/02; H04L 67/2814; H04L 69/16; H04W 12/08; H04W 88/16
USPC .......................................................... 370/352
See application file for complete search history.

(56) References Cited

U.S. PATENT DOCUMENTS

| | | | | |
|---|---|---|---|---|
| 2010/0205302 A1* | 8/2010 | Rechterman | .......... | H04L 67/025 709/226 |
| 2012/0090030 A1* | 4/2012 | Rapaport | ............ | H04L 63/1441 726/23 |
| 2012/0271909 A1* | 10/2012 | Huang | ................ | H04L 61/1511 709/217 |
| 2013/0167196 A1* | 6/2013 | Spencer | ................ | H04W 8/22 726/3 |
| 2014/0173415 A1* | 6/2014 | Kattil Cherian | .......... | G06F 9/54 715/234 |
| 2016/0072815 A1* | 3/2016 | Rieke | ................ | H04L 63/1433 726/3 |
| 2016/0134554 A1* | 5/2016 | Deckers | ................ | H04L 67/02 709/226 |
| 2016/0164992 A1* | 6/2016 | Prasad | ................ | H04L 67/2814 709/217 |
| 2016/0205002 A1* | 7/2016 | Rieke | ................ | H04L 41/142 709/224 |
| 2016/0205185 A1* | 7/2016 | Gampel | ................ | H04L 67/02 709/218 |
| 2017/0230478 A1* | 8/2017 | Huang | ................ | H04L 67/327 |
| 2018/0034809 A1* | 2/2018 | Lavedrine | ........... | H04L 63/0807 |
| 2018/0219960 A1* | 8/2018 | Knecht | ................ | H04L 67/20 |

OTHER PUBLICATIONS

"Rescorla RTFM E et al: ""Security Considerations for WebRTC;draft-ietf-rtcweb-security-08.txt""", Security Considerations for WEBRTC; DRAFT-IETF-RTCWEB-SECURITY-08.TXT, Internet Engineering Task Force, IETF; STANDARDWORKINGDRAFT, Internet Society (ISOC) 4, Rue Des Falaises CH-1205 Geneva. Switzerland. Feb. 26, 2015 (Feb. 26, 2015). pp. 1-24."

Shieh, G. et al. "WebRTC IP Address Handling Recommendations" draft-shieh-rtha.ip.cwebndling-00, Oct. 19, 2015, section 2.

International Search Report by the International Searching Authority issued in International Application No. PCT/CN2016/104306 dated Jan. 24, 2017; 8 pages.

Li, Lin "Security Analysis of P2P RTC based on Web Browsers," Computer Security, Jun. 30, 2012, 3 pages (with English Abstract).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

IP ADDRESS ACQUISITION METHOD AND APPARATUS

This application is a continuation of PCT Application No. PCT/CN2016/104306, filed on Nov. 2, 2016, which claims priority to Chinese Patent Application No. 201510764761.9, filed on Nov. 11, 2015, and each application is hereby incorporated by reference in its entirety.

TECHNICAL FIELD

The present application relates to the field of information technologies, and in particular, to an IP address acquisition method and apparatus.

BACKGROUND

With the development of the information society, people are accustomed to using the Internet for social activities such as online shopping, online banking, and instant messaging. The exposure of online activities related to personal property attracts more attention of people (for example, a financial activity and a transaction activity). Therefore, people begin to monitor an Internet Protocol (IP) address of each terminal in the network, so as to evaluate a degree of threat in the network, and to prevent any high potential threats from an IP address. If necessary, an access request of such an IP address can be rejected, so as to improve overall network security.

However, in a traditional IP address acquisition method, when an IP address of a terminal is monitored, the IP address of the terminal can be obtained from a request or a response message header transmitted using the Hypertext Transfer Protocol (HTTP). However, it is easy for a malicious actor to change IP address information included in the HTTP message header by installing a browser plug-in or hacker software or by using a proxy server. Consequently, an accurate and authentic IP address may not be obtained.

It can be seen that, in traditional terminal IP address acquisition methods, authenticity and accuracy of an obtained IP address are relatively low, thereby reducing accuracy of other information processed based on the terminal IP address.

SUMMARY

Embodiments of the present application provide an IP address acquisition method and apparatus, so as to resolve a prior-art problem that authenticity and accuracy of an IP address obtained by using only the HTTP request message header are relatively low.

An embodiment of the present application provides an IP address acquisition method, including: receiving, by a network-side device, a request message of a first protocol sent by a terminal; returning a web page including scripting language code to the terminal based on the request message of the first protocol; receiving a request message for establishing a communication connection sent by the terminal by running the scripting language code; establishing a communication connection to the terminal based on the request message for establishing a communication connection; and determining a first IP address of the terminal by using the communication connection.

An embodiment of the present application provides an IP address acquisition method, including: sending, by a terminal, a request message of a first protocol to a network-side device; receiving a web page sent by the network-side device based on the request message of the first protocol, where the web page includes scripting language code; running the scripting language code, and sending, to the network-side device based on the scripting language code, a request message for establishing a communication connection, so that the network-side device establishes a communication connection to the terminal; and sending a data packet to the network-side device by using the communication connection, so that the network-side device determines a first IP address of the terminal based on the data packet.

An embodiment of the present application provides an IP address acquisition apparatus, including: a first receiving module, configured to receive a request message of a first protocol sent by a terminal; a returning module, configured to return a web page including scripting language code to the terminal based on the request message of the first protocol; a second receiving module, configured to receive a request message for establishing a communication connection sent by the terminal by running the scripting language code; a communication connection module, configured to establish a communication connection to the terminal based on the request message for establishing a communication connection; and an acquisition module, configured to obtain a first IP address of the terminal by using the communication connection.

An embodiment of the present application provides an IP address acquisition apparatus, including: a first sending module, configured to send a request message of a first protocol to a network-side device; a receiving module, configured to receive a web page sent by the network-side device based on the request message of the first protocol, where the web page includes scripting language code; a communication connection module, configured to: run the scripting language code, and send, to the network-side device based on the scripting language code, a request message for establishing a communication connection, so that the network-side device establishes a communication connection to the apparatus; and a second sending module, configured to send a data packet to the network-side device by using the communication connection, so that the network-side device determines a first IP address of the apparatus based on the data packet.

The embodiments of the present application provide IP address acquisition method and apparatus. In some embodiments, the network-side device receives a request message of a first protocol sent by the terminal, and returns a web page including a scripting language code to the terminal based on the request message. The terminal establishes a communication connection to the network-side device by running the scripting language code, and determines the first IP address of the terminal by using the communication connection. In the IP address acquisition method, the network-side device can determine an authentic IP address of an access terminal, and improve the authenticity and accuracy of the determined authentic IP address, thereby improving accuracy of other information processing that needs to be performed based on a terminal IP address.

BRIEF DESCRIPTION OF DRAWINGS

The accompanying drawings described herein are intended to provide a further understanding of the present application, and constitute a part of the present application. The example embodiments of the present application and descriptions thereof are intended to explain the present application, and do not constitute an improper limitation on the present application. In the accompanying drawings.

DETAILED DESCRIPTION

In traditional IP address acquisition methods, an IP address of a terminal can be obtained by using an HTTP request message, and the IP address of the terminal is determined based on an HTTP request message header. Consequently, in this method, the IP address of the terminal is easily masqueraded and tampered with by using a browser plug-in, a proxy server, etc., and therefore, authenticity and accuracy of the obtained IP address of the terminal are relatively low. To improve authenticity and accuracy of the obtained IP address, a communication connection is established in some embodiments of the present application. The communication connection is established to enable a network-side device to obtain an authentic IP address of the terminal. Therefore, the communication connection can be used for other than normal communication (for example, a video communication connection is established, but video data is not transmitted between the terminal and the network-side device), and establishing the communication connection can be a superficial operation. Because the authentic IP address of the terminal is obtained when establishing the communication connection, the network-side device can obtain the authentic IP address of the terminal by using the communication connection. In these embodiments of the present application, the network-side device returns a web page including a scripting language code to the terminal that sends a request message of a first protocol. The terminal establishes a communication connection to the network-side device by running the scripting language code, and determines a first IP address of the terminal by using the communication connection. Therefore, the IP address of the terminal can not only determined by using an IP address included in the HTTP request message header, but also can be determined by using the established communication connection. In this case, a malicious act of modifying or masquerading the IP address in the HTTP request message header is rendered ineffective, thereby improving the accuracy and authenticity of the IP address of the terminal obtained by the network-side device. Embodiments of the present disclosure improve reliability of the obtained IP address of the terminal (a degree reflecting that the obtained IP address is the authentic IP address) and further improve accuracy of other information processing that needs to be performed based on the IP address.

To meet the objectives, technical solutions, and advantages of the present application, the following describes the technical solutions of the present application with reference to specific embodiments of the present application and corresponding accompanying drawings. The described embodiments are merely some rather than all of the embodiments of the present application. Other embodiments obtained by a person of ordinary skill in the art based on the embodiments of the present application without creative efforts shall fall within the protection scope of the present application.

Figure 1:
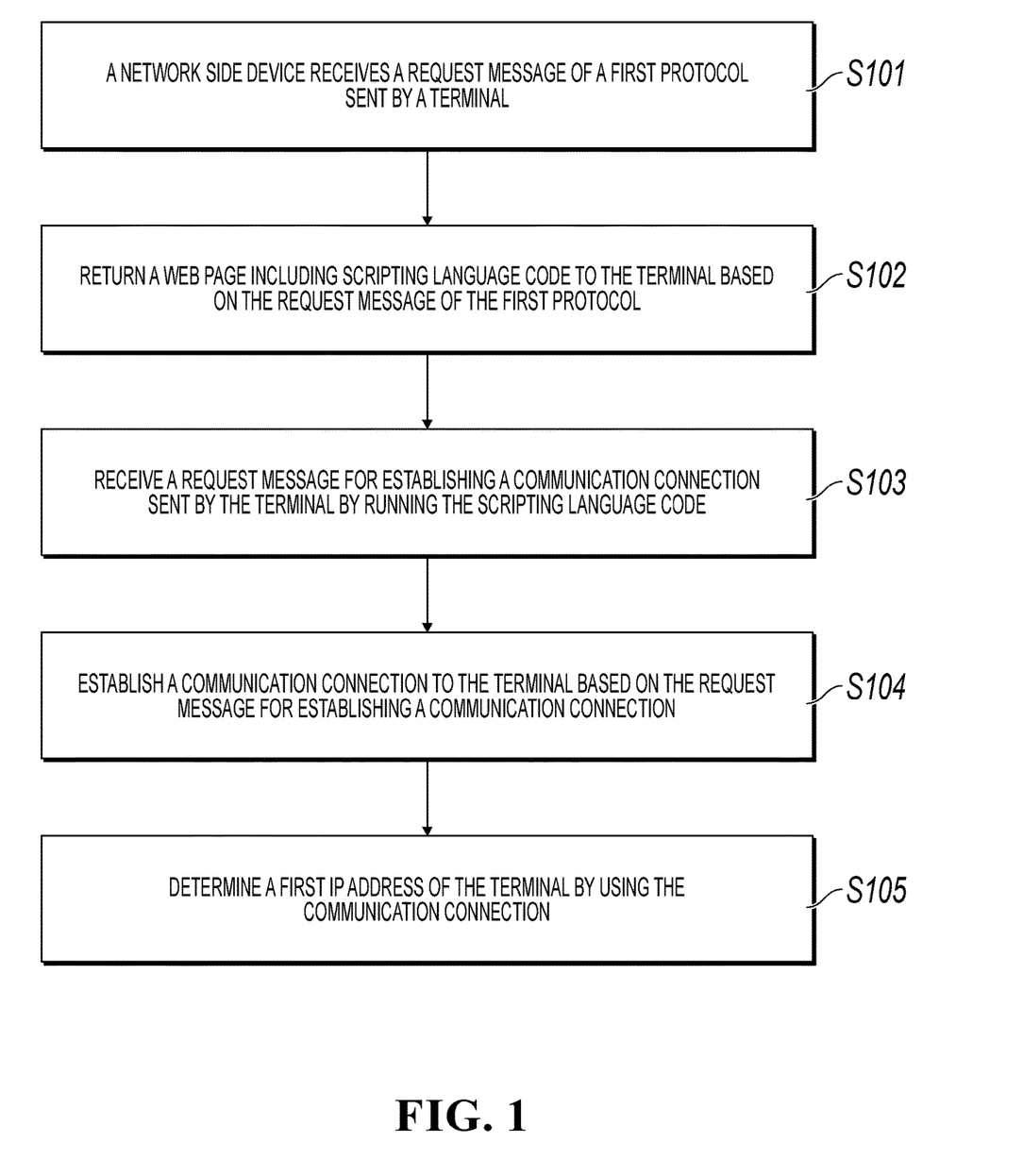
FIG. 1 is an IP address acquisition process according to an embodiment of the present application.

FIG. 1 is an IP address acquisition process according to an embodiment of the present application. The IP address acquisition process of FIG. 1 includes the following steps:

S101: A network-side device receives a request message of a first protocol sent by a terminal.

Because a terminal usually needs to pass through a gateway of a server of a website before accessing the server, the network-side device in step S101 can be a gateway, and the gateway receives the request message of the first protocol sent by the terminal.

Or the network-side device in the present application can be a server, and the server receives the request message of the first protocol sent by the terminal. In addition, the gateway in the present application can be a separate device independent of the server, or can be a device integrated with the server. The present invention sets no special limitation here.

In addition, the first protocol can be HTTP. Because a request/response mode is used in HTTP, the request message in the present application can be a request message sent by the terminal based on HTTP. The HTTP request message can include an access request address (an address of the server), an IP address of the terminal, etc.

The terminal in this embodiment of the present application can be various terminals such as a mobile phone, a personal computer (PC), and a tablet computer.

The following uses an example in which the network-side device is a gateway for description.

For example, if Jack is to access an online bank website by using a terminal to operate his own account, Jack can enter an address of the online bank web site in a browser address bar, and the terminal may generate and send an HTTP request message based on the address, so as to access the online bank website. Because a server corresponding to the online bank website is provided with a gateway, the gateway may receive the HTTP request message sent by the terminal.

S102: Return a web page including scripting language code to the terminal based on the request message of the first protocol.

In this embodiment of the present application, if the terminal accesses a network by using a device such as a router or a proxy server, a source IP address included in a message header of the request message of the first protocol can be an IP address of the router or the proxy server instead of an authentic IP address of the terminal. If a malicious actor tampers with the source IP address included in the message header of the request message of the first protocol, the source IP address is not the authentic IP address of the terminal either. Therefore, because the source IP address included in the message header of the request message of the first protocol is other than the authentic IP address of the terminal, the authentic IP address of the terminal can be determined by the described method.

To determine the authentic IP address of the terminal, if the network-side device receiving the HTTP request message is a gateway, the gateway can forward, to a server, the HTTP request message sent by the terminal. After receiving the request message, the server returns a corresponding web page, and the web page includes predetermined scripting language code. The gateway can return the web page including the scripting language code to the terminal. The scripting language code runs on the terminal, so that the terminal can obtain the authentic IP address of the terminal and send the authentic IP address to the gateway. If the network-side device receiving the HTTP request message is a server, the server can directly return the web page including the scripting language code to the terminal based on the HTTP request message.

In some embodiments in the present application, the network-side device may not directly return the web page including the scripting language code, but provides an address for downloading the scripting language code in web page code corresponding to the web page, so that after subsequently parsing the web page code, the terminal can download the scripting language code from another network-side device (for example, the server) and run the scripting language code.

The scripting language code can include, but is not limited to, JavaScript code. The JavaScript code can be used to enable the terminal to run the JavaScript code, so that the terminal can obtain the authentic IP address of the terminal and send the authentic IP address to the network-side device.

In the previously provided example, after the gateway of the online bank receives the HTTP request message sent by the Jack's terminal, the gateway forwards the HTTP request message to the server, so that the server returns a corresponding web page. Then, the gateway sends, to the terminal, the web page returned by the server based on the HTTP request message. The web page includes, for example, JavaScript code.

S103: Receive a request message for establishing a communication connection sent by the terminal by running the scripting language code.

S104: Establish a communication connection to the terminal based on the request message for establishing a communication connection.

S105: Determine a first IP address of the terminal by using the communication connection.

In this embodiment of the present application, after receiving the web page sent by the network-side device, the terminal may parse the web page code corresponding to the web page. Because the web page includes the scripting language code, the terminal may load and run the scripting language code when parsing the web page code.

In addition, a function of the scripting language code in this embodiment of the present application is to enable the terminal to send, to the network-side device, the request message for establishing a communication connection, so that the network-side device establishes the communication connection to the terminal, and obtains the authentic IP address of the terminal by using the communication connection. Therefore, after the terminal runs the scripting language code, the terminal sends, to the network-side device, the request message for establishing a communication connection, and in step S103, the network-side device receives the request message for establishing a communication connection.

In step S104, after receiving the request message for establishing a communication connection sent by the terminal, the network-side device can establish the communication connection to the terminal. The communication connection in the present application can be the Web Real-Time Communication (WebRTC) connection, and WebRTC is based on Simple Traversal of User Datagram Protocol through Network Address Translators (STUN). When STUN specifies that such a communication connection as WebRTC is to be used, both parties that establish the communication connection need to use respective authentic IP addresses to establish the connection (the two parties that establish the communication connection need to obtain the authentic IP addresses of each other), and User Datagram Protocol (UDP) "hole punching" is performed when the authentic IP address of the terminal is being determined. Therefore, in some embodiments in the present application, a method for determining the first IP address of the terminal by using the communication connection in step S105 is actually to determine the authentic IP address of the terminal by using UDP "hole punching". An example process can be as follows:

First, the network-side device receives a data packet of a second protocol sent by the terminal, and the data packet of the second protocol is sent by the terminal by running the JavaScript code. The second protocol can be UDP. In addition, because the communication connection in some embodiments of the present application can be WebRTC, the network-side device can receive, by using WebRTC, a UDP data packet sent by the terminal.

Second, the network-side device can determine a source IP address of the UDP data packet.

Third, the network-side device writes the source IP address to a UDP response packet. The network-side device can write the source IP address to the UDP response packet as content of the UDP response packet instead of a source IP address of the UDP response packet, and then return the UDP response packet including the source IP address to the terminal.

Then, after the terminal receives the UDP response packet, the terminal uses the authentic IP address of the terminal as a first IP address and sends the first IP address to the network-side device. There are many methods for sending the first IP address. The first IP address can be written to another UDP packet and sent to the network-side device by using WebRTC, or the first IP address can be written to content of another HTTP message and sent to the network-side device by using the HTTP message. It should be noted that, a method for sending the first IP address can be selected based on a specific implementation situation, and is not specifically limited in the present application.

Finally, in this embodiment of the present application, if the first IP address of the terminal is included in the UDP data packet and is sent to the network-side device by using WebRTC, after receiving the UDP data packet sent by the terminal, the network-side device can obtain the first IP address of the terminal, that is, the authentic IP address of the terminal.

In the process of determining the first IP address of the terminal by using the communication connection, the network-side device can perform a second-protocol (for example, UDP "hole punching") by using the established communication connection (for example, WebRTC) and the protocol (STUN) used for the communication connection, so that the network-side device eventually obtains the first IP address of the terminal (the authentic IP address of the terminal).

In the Jack bank account example, the gateway of the online bank receives a request message for establishing a WebRTC from the Jack's terminal, and establishes the WebRTC with the terminal based on the request message. The gateway receives a UDP data packet sent by the terminal, and determines that a source IP address for sending the data packet is, for example, 206.128.127.25. The gateway writes the source IP address to a UDP response packet and returns the UDP response packet to the terminal, so that the terminal uses an authentic IP address (for example, 118.168.200.18) of the terminal as a first IP address based on the source IP address included in the received UDP response packet, writes the first IP address to content of the HTTP message, and sends the HTTP message to the gateway. After receiving the HTTP request message, the gateway parses the first IP address of the terminal from the content of the HTTP request message. The gateway eventually determines that the first IP address of the terminal is 118.168.200.18.

In addition, in this embodiment of the present application, the network-side device may further determine a second IP address of the terminal by receiving the request message of the first protocol sent by the terminal in step S101. When the first protocol is HTTP, the network-side device can obtain the source IP address included in the message header of the request message of the first protocol, and use the source IP address as the second IP address of the terminal. Because the network-side device further obtains the first IP address of the terminal in step S105, the network-side device can perform risk control processing based on the two IP addresses, or send the two IP addresses to a device (for example, a server in a risk control system) for risk control processing. A specific device for risk control processing is not limited in the present application.

Risk control processing can be as follows: the two IP addresses of the terminal are obtained, for example, by using different methods (for example, separately based on the HTTP request message header and WebRTC), if the first IP address and the second IP address of the terminal obtained by the network-side device are inconsistent, it can be considered that the terminal sends the HTTP request message by using at least a proxy server. In addition, the IP address of the terminal may be maliciously tampered with for illegal activities. Therefore, a monitoring level of a subsequent activity of the first IP address corresponding to the terminal may be raised. Because the obtained first IP address of the terminal is the authentic IP address of the terminal, a historical activity record of the first IP address can be further checked, to determine whether the first IP address is involved in an illegal activity in past.

In the Jack bank account example, the gateway obtains the HTTP request message in step S101. The gateway determines the source IP address included in the message header as the second IP address of the terminal, such as 206.128.127.25. After the gateway obtains the first IP address of the terminal in step S105, the gateway can send the obtained first IP address and the obtained second IP address of the Jack's terminal to a risk control system for risk control processing. When the obtained first IP address (for example, 118.168.200.18) is not the same as the second IP address (for example, 206.128.127.25), the risk control system considers the first IP address (118.168.200.18) as a key monitoring target, so as to prevent an activity of the IP address from threatening security of the online bank.

According to the IP address acquisition method shown in FIG. 1, the network-side device can obtain the authentic IP address of the terminal by establishing a masqueraded communication connection, and the IP address obtained by using the masqueraded communication connection is more authentic than the IP address obtained by using, for example, a HTTP request message header. In the IP address acquisition method in FIG. 1, the network-side device can effectively determine an authentic IP address of an access terminal, and authenticity and accuracy of the authentic IP address obtained by the network-side device are relatively high, thereby improving accuracy of other information processing that may be performed based on a terminal IP address.

Figure 2:
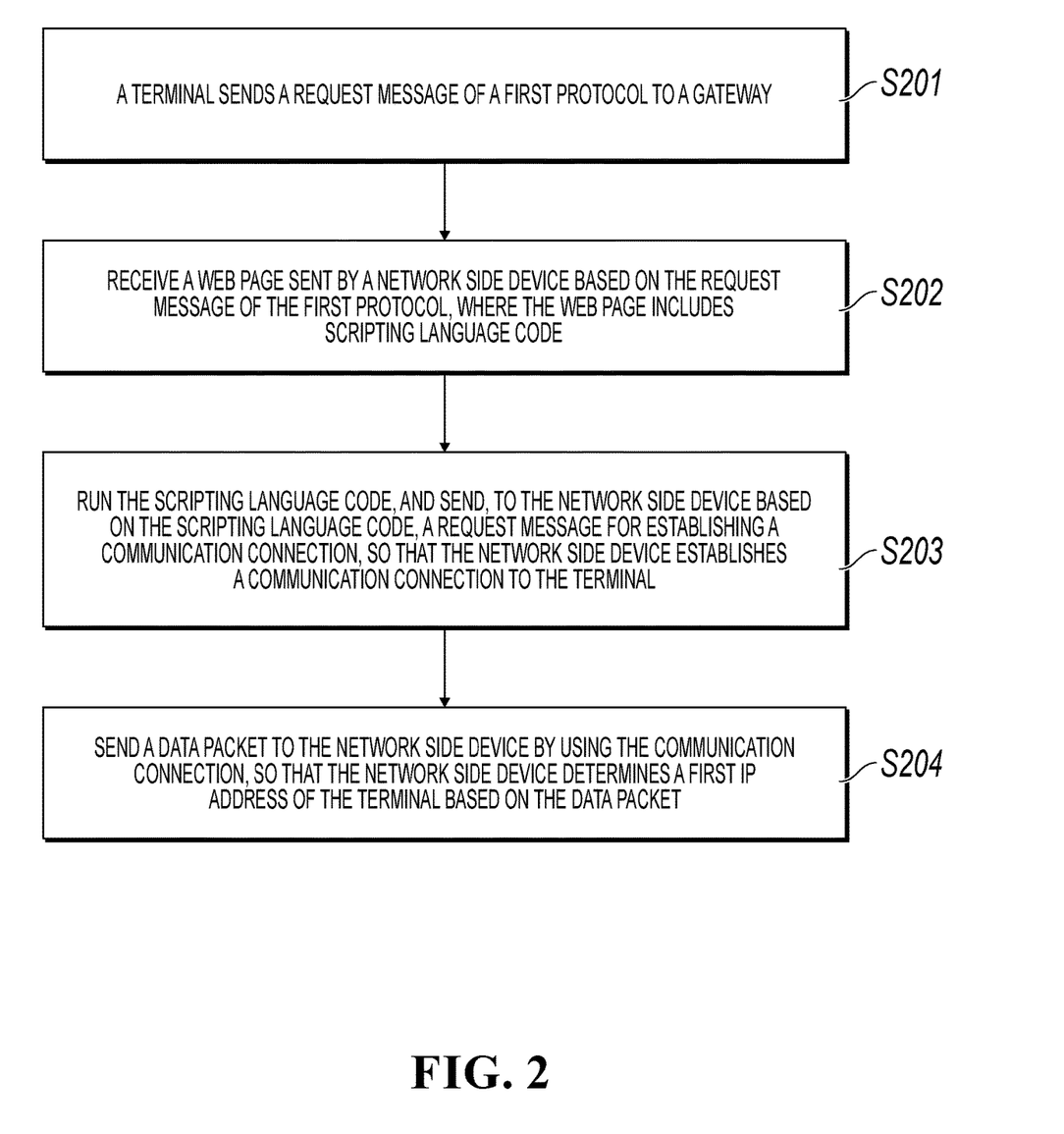
FIG. 2 is an IP address acquisition process corresponding to FIG. 1 according to an embodiment of the present application.

Based on the IP address acquisition process executed by the network-side device shown in FIG. 1, as shown in FIG. 2, an embodiment of the present application further provides an IP address acquisition process executed by a terminal.

FIG. 2 is an IP address acquisition process corresponding to FIG. 1 according to an embodiment of the present application. The IP address acquisition process of FIG. 2 includes the following steps.

S201: A terminal sends a request message of a first protocol to a network-side device, for example, a gateway.

In this embodiment of the present application, if the terminal is to access a website, the terminal may need to first send an access request message to the website. The access request message is the request message of the first protocol. The first protocol can be HTTP, and the request message of the first protocol is an HTTP request message in this case. Because the network-side device receiving the HTTP request message sent by the terminal can obtain a second IP address of the terminal by using an HTTP request message header, the terminal sends the HTTP request message to the network-side device, so that the network-side device can determine the second IP address of the terminal based on the HTTP request message.

S202: Receive a web page sent by the network-side device based on the request message of the first protocol, where the web page includes scripting language code.

In this embodiment of the present application, the network-side device determines the second IP address of the access terminal in step S201. However, if the second IP address of the access terminal is obtained from the HTTP request message header, when the terminal changes an IP address in the message header of the HTTP request message by installing a browser plug-in or hacker software or by using a proxy server, the network-side device obtains a forged and false terminal IP address. In this case, the IP address obtained by the network-side device is neither authentic nor accurate. Therefore, the present application enables the network-side device to obtain an authentic IP address of the terminal, so that the network-side device can obtain the authentic IP address of the terminal, even when the terminal forges the IP address of the terminal.

When the network-side device is a gateway, after the terminal sends the request message of the first protocol to the gateway, the gateway may send the request message of the first protocol to a server, and the server returns a corresponding web page to the gateway based on the request message. The gateway returns the web page to the terminal, and the terminal receives the web page returned by the gateway. The web page includes the scripting language code (the scripting language code can be JavaScript code). When the terminal parses web page code of the web page, the terminal loads and runs the JavaScript code. The JavaScript code is used to enable the terminal to run the JavaScript code to obtain the authentic IP address of the terminal, and send the authentic IP address to the corresponding gateway.

S203: Run the scripting language code, and send, to the network-side device based on the scripting language code, a request message for establishing a communication connection, so that the network-side device establishes a communication connection to the terminal.

S204: Send a data packet to the network-side device by using the communication connection, so that the network-side device determines a first IP address of the terminal based on the data packet.

In this embodiment of the present application, after running the JavaScript code, based on the JavaScript code, the terminal sends, to the network-side device that sends the web page, a request message for establishing a communication connection. The communication connection can be WebRTC. Because of the reason in step S103 to step S105, based on WebRTC, the network-side device may perform UDP "hole punching" to enable the terminal to obtain the authentic IP address of the terminal and send the authentic IP address to the network-side device. The terminal sends the authentic IP address of the terminal to the network-side device in the subsequent step S204.

Therefore, after the terminal establishes WebRTC with the network-side device, in step S204, the terminal can first send a data packet of a second protocol to the network-side device to which the HTTP request message was sent in step S201. The second protocol can be UDP. For example, the terminal sends a UDP data packet to the network-side device after establishing WebRTC with the network-side device. The UDP data packet can be a null data packet without any content, so that network resources can be saved, and a load on the network-side device can be reduced.

After receiving the UDP data packet, the network-side device can determine a source IP address of the UDP data packet, and add the source IP address to a UDP response packet that is returned to the terminal. In this case, after receiving the UDP response packet returned by the network-side device, the terminal can parse content of the UDP response packet, and obtain the source IP address of the terminal that is included in the UDP response packet.

After obtaining the source IP address included in the UDP response packet, the terminal can compare the source IP address with the authentic IP address of the terminal. In some embodiments, if the two are consistent, the terminal uses the source IP address or the authentic IP address of the terminal as the first IP address, and sends the first IP address to the network-side device; if the two are inconsistent, the terminal uses the authentic IP address of the terminal as the first IP address, and sends the first IP address to the network-side device. The first IP address can be sent to the network-side device by writing the first IP address to content of a HTTP request message or by writing the first IP address to another UDP data packet. A specific method for sending the first IP address to the network-side device is not limited in the present application.

In addition, when the source IP address is consistent with the authentic IP address of the terminal, acknowledgment information can be returned instead of the first IP address, so that the network-side device determines, based on the acknowledgment information, that the source IP address obtained by the network-side device is the authentic IP address of the terminal.

Further, after obtaining the first IP address of the terminal, the network-side device can perform risk control based on the first IP address and the second IP address obtained in step S202.

Figure 3:
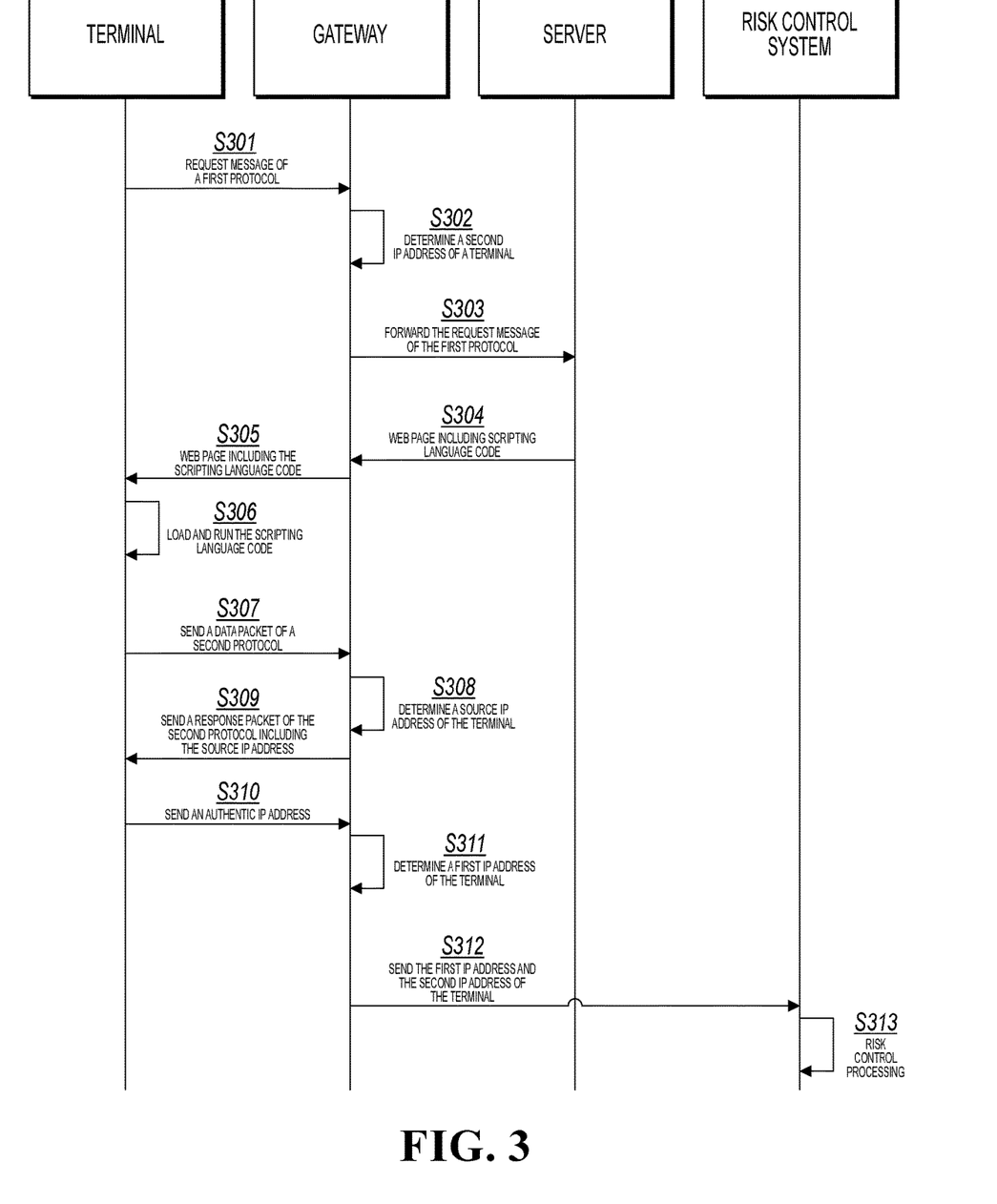
FIG. 3 is a detailed flowchart illustrating risk control according to an embodiment of the present application.

As shown in FIG. 3, FIG. 3 is a detailed flowchart illustrating risk control according to an embodiment of the present application.

S301: A terminal sends a request message of a first protocol to a gateway.

S302: The gateway determines a second IP address of the terminal based on the request message of the first protocol.

S303: The gateway forwards the request message of the first protocol to a server.

S304: The server returns a web page including scripting language code to the gateway.

S305: The gateway forwards the web page including the scripting language code to the terminal.

S306: The terminal receives the web page returned by the gateway, parses a web page code of the web page, and loads and runs the scripting language code included in the web page.

S307: The terminal sends a data packet of a second protocol to the gateway.

S308: The gateway receives the data packet of the second protocol sent by the terminal, and determines a source IP address of the terminal.

S309: The gateway sends a response packet of the second protocol including the source IP address of the terminal to the terminal.

S310. The terminal sends an authentic IP address of the terminal to the gateway based on the received response packet of the second protocol.

S311: The gateway receives the authentic IP address sent by the terminal, and uses the authentic IP address as a first IP address of the terminal.

S312: The gateway sends the first IP address and the second IP address of the terminal to a risk control system.

S313: The risk control system performs risk control processing based on the received first IP address and the received second IP address of the terminal.

Figure 4:
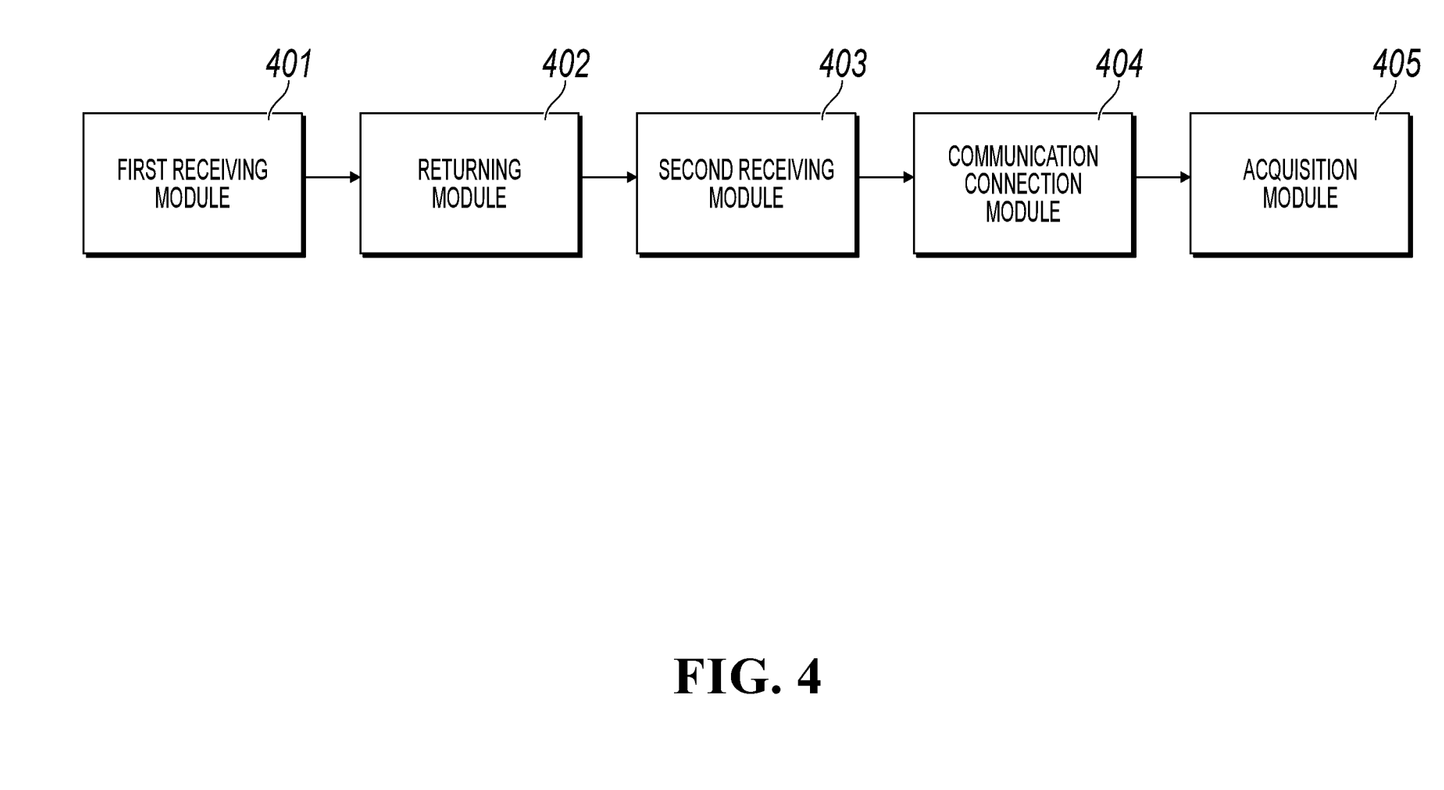
FIG. 4 is a first schematic structural diagram illustrating an IP address acquisition apparatus according to an embodiment of the present application.
Figure 5:
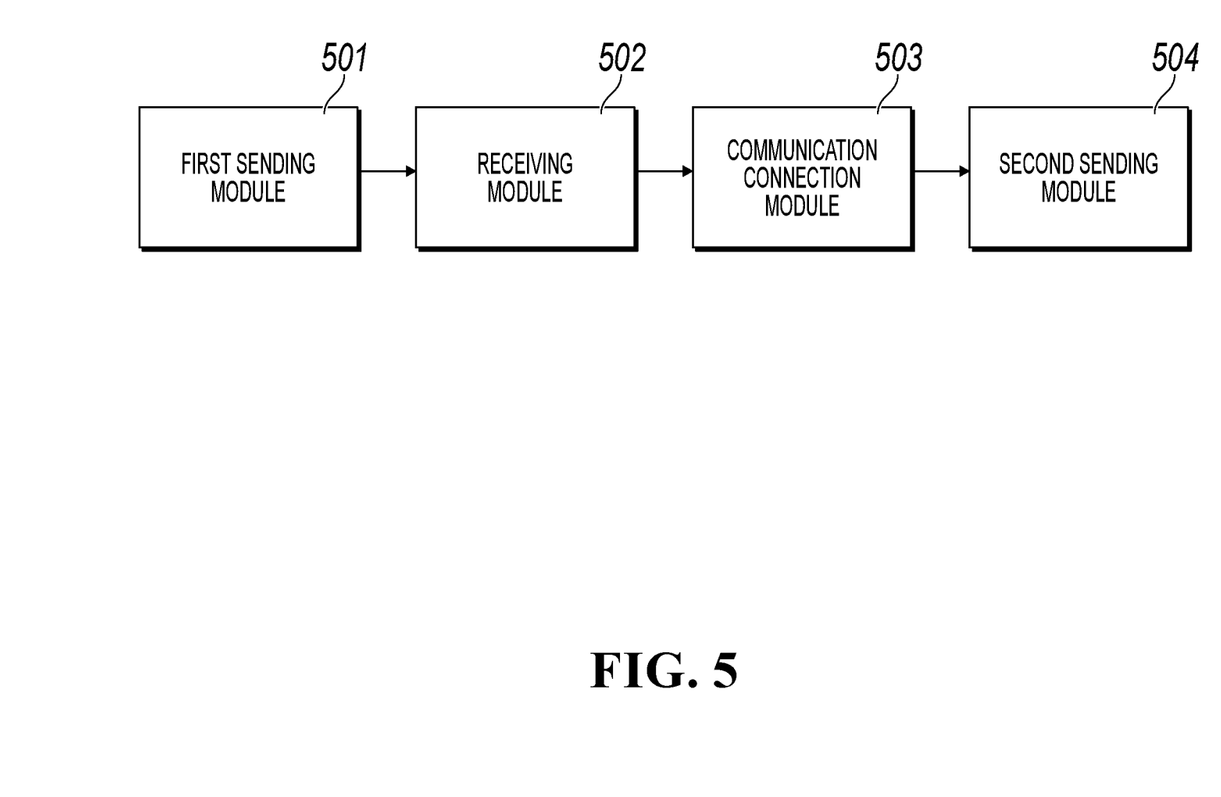
FIG. 5 is a second schematic structural diagram illustrating an IP address acquisition apparatus according to an embodiment of the present application.

The IP address acquisition method provided in the present application is described above. Based on the same idea, as shown in FIG. 4 and FIG. 5, embodiments of the present application further provide corresponding IP address acquisition apparatuses. FIG. 4 is a first schematic structural diagram illustrating an IP address acquisition apparatus according to an embodiment of the present application. The IP address acquisition apparatus of FIG. 4 includes: a first receiving module 401, a running module 402, a second receiving module 403, a communication connection module 404, and an acquisition module 405. The first receiving module 401 is configured to receive a request message of a first protocol sent by a terminal. The returning module 402 is configured to return a web page including scripting language code to the terminal based on the request message of the first protocol. The second receiving module 403 is configured to receive a request message for establishing a communication connection sent by the terminal by running the scripting language code. The communication connection module 404 is configured to establish a communication connection to the terminal based on the request message for establishing a communication connection. The acquisition module 405 is configured to determine a first IP address of the terminal by using the communication connection.

The acquisition module 405 is configured to: receive a data packet of a second protocol sent by the terminal based on the scripting language code by using the communication connection; determine a source IP address of the data packet of the second protocol; add the source IP address to a response packet of the second protocol, and return the response packet of the second protocol to the terminal; and receive an IP address returned by the terminal based on the source IP address included in the response packet of the second protocol, and use the returned IP address as the first IP address of the terminal determined by using the communication connection.

The apparatus can further include a risk control module 406, configured to: determine a second IP address of the terminal based on the request message of the first protocol, and perform risk control processing on the terminal based on the first IP address and the second IP address.

In the IP address acquisition apparatus, the first protocol can include a Hypertext Transfer Protocol (HTTP), the scripting language code can include JavaScript code, the communication connection can include a Web Real-Time Communication (WebRTC) connection, and the second protocol can include User Datagram Protocol (UDP).

The IP address acquisition apparatus shown in FIG. 4 can be located in gateways of various websites or can be located on a server.

FIG. 5 is a second schematic structural diagram illustrating an IP address acquisition apparatus according to an embodiment of the present application. The IP address acquisition apparatus includes: a first sending module 501, a receiving module 502, a communication connection module 503, and a second sending module 504. The first sending module 501 is configured to send a request message of a first protocol to a network-side device. The receiving module 502 is configured to receive a web page sent by the network-side device based on the request message of the first protocol, where the web page includes scripting language code. The communication connection module 503 is configured to: run the scripting language code, and send, to the network-side device based on the scripting language code, a request message for establishing a communication connection, so that the network-side device establishes a communication connection to the apparatus. The second sending module 504 is configured to send a data packet to the network-side device by using the communication connection, so that the network-side device determines a first IP address of the apparatus based on the data packet.

The second sending module 504 can be configured to: send a data packet of a second protocol to the network-side device based on the scripting language code by using the communication connection, so that the network-side device determines a source IP address for the data packet of the second protocol; receive a response packet of the second protocol, where the response packet of the second protocol is returned by the network-side device and includes the source IP address; and determine an authentic IP address of the apparatus, use the authentic IP address as the first IP address of the apparatus, and send the first IP address of the apparatus to the network-side device.

In the IP address acquisition apparatus, the first protocol can include a Hypertext Transfer Protocol (HTTP), the scripting language code can include JavaScript code, the communication connection can include a Web Real-Time Communication (WebRTC) connection, and the second protocol can include User Datagram Protocol (UDP).

The IP address acquisition apparatus shown in FIG. 5 can be located in various terminals, such as a mobile phone, a PC, and a tablet computer.

In a typical configuration, a computing device includes one or more processors (CPU), an input/output interface, a network interface, and a memory.

The memory can include a non-persistent memory, a random access memory (RAM), a non-volatile memory, or another form that is in a computer readable medium, for example, a read-only memory (ROM) or a storage device (flash memory). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: parameter random access memory (PRAM), static random access memory (SRAM), dynamic random access memory (DRAM) or another type of random access memory (RAM), read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, magnetic tape, magnetic tape, a magnetic disk memory or another magnetic storage device, or any other non-transmission medium that can be used to store information that can be accessed by a computing device.

It should be further noted that, the terms "include", "contain", or their any other variant is intended to cover a non-exclusive inclusion, so that a process, a method, an article, or a device that includes a list of elements not only includes those elements but also includes other elements that are not expressly listed, or further includes elements inherent to such process, method, article, or device. An element defined by "includes a . . . " can further include, without more constraints, another identical element in the process, method, article, or device that includes the element.

A person skilled in the art should understand that the embodiments of the present application can be provided as a method, a system, or a computer program product. Therefore, the present application can use a form of hardware only embodiments, software only embodiments, or embodiments with a combination of software and hardware. Moreover, the present application can use a form of a computer program product implemented on one or more computer-usable storage media (including but not limited to a magnetic disk memory, a CD-ROM, an optical memory, etc.) that include computer usable program code.

The foregoing embodiments are merely example embodiments of the present application, and are not intended to limit the present application. A person skilled in the art can make various modifications and changes to the present application. Any modification, equivalent replacement, or improvement made without departing from the spirit and principle of the present application shall fall within the scope of the claims of the present application.

Figure 6:
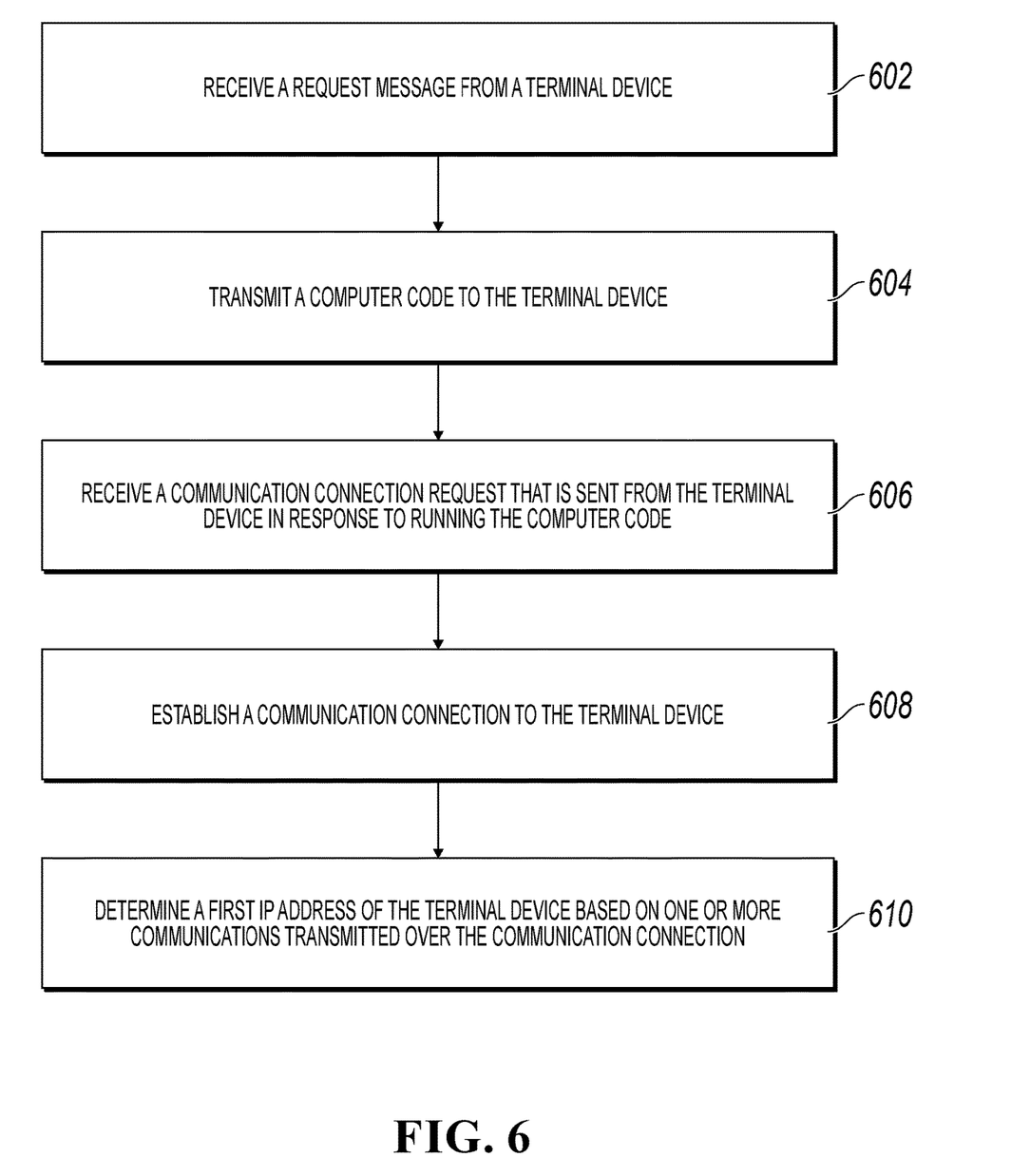
FIG. 6 is a flowchart illustrating an example of a computer-implemented method for IP address acquisition, according to an implementation of the present disclosure.

FIG. 6 is a flowchart illustrating an example computer-implemented method 600 for IP address acquisition, according to an implementation of the present disclosure. For example, method 600 can be performed by a network-side device to determine an authentic IP address of a terminal device. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a request message is received from a terminal device. The request message can include a request for a service. For example, the terminal device may send a request for a web page (for example, ABC.com) through the request message. In the example apparatus of FIG. 4, the request message can be received at the first receiving module 401. From 602, method 600 proceeds to 604.

At 604, computer code is transmitted to the terminal device. For example, the computer code can be included in a web page that is being sent to the terminal device in response to receiving the request message. The web page can be based on the service requested in the request message (for example, the web page ABC.com), or can be a default web page (or a message) that is sent in response to receiving the request message. The computer code can be scripting language code, such as a JavaScript code. In the example apparatus of FIG. 4, the computer code can be transmitted by the returning module 402. From 604, method 600 proceeds to 606.

At 606, a communication connection request is received from the terminal device; the communication connection request is sent from the terminal device in response to running the computer code on the terminal device. For example, when the computer code is received at the terminal device, the computer code runs on the terminal device to send the communication connection request to the network-side device. For example, when the web page opens on the terminal device, the computer code runs on the terminal device. In the example apparatus of FIG. 4, the communication connection request can be performed by the second receiving module 403. From 606, the method 600 proceeds to 608.

At 608, a communication connection to the terminal device is established. The communication connection can be established in response to receiving the communication connection request from the terminal device. The communication connection can be a WebRTC connection. In the example apparatus of FIG. 4, the communication connection can be established by the communication connection module 404. From 608, the method 600 proceeds to 610.

At 610, a first IP address of the terminal device is determined based on one or more communications transmitted over the communication connection. In the example apparatus of FIG. 4, the first IP address can be determined by the acquisition module 405. At least one of the one or more communications can be UDP. Examples of the one or more communications are provided in the following paragraphs.

In some implementations, the computer code causes the terminal device to send a data packet to the network-side device (for example, through the communication connection). When the data packet is received at the network-side device, the network-side device can determine a source IP address of the data packet. The source IP address is associated with the terminal device. For example, the source IP address can be an IP address of the terminal device (forged or accurate IP address), or an IP address of a secondary device (for example, a router or a proxy server) through which the terminal device communicates with the network-side device.

The first IP address can be determined based on the source IP address. For example, the first IP address can be determined based on a terminal IP address that is determined based on the source IP address. In some examples, the network-side device sends a respond data packet that includes the source IP address (or a variation of the source IP address) to the terminal device, and the terminal device determines a terminal IP address based on the source IP address. The terminal device sends the terminal IP address to the network-side device and the network-side device determines the first IP address based on the terminal IP address. In some examples, the first IP address is the same as the terminal IP address; in some examples, the first IP address is a variation of the terminal IP address.

The transmissions between the terminal device and the network-side device can use a variety of protocols. In some implementations, a transmission uses a particular protocol based on the purpose of the transmission. For example, a request message that is transmitted for requesting a service may use a first protocol and a communication that is transmitted for the purpose of determining the first IP address may use a second protocol. The first and the second protocol may be the same or may differ. In an example, the first protocol is HTTP, and the second protocol is UDP. In some implementations, all communications that are transmitted for the purpose of determining the first IP address use the same protocol. For example, the communication connection can be a WebRTC and all the communications transmitted through the communication connection can be UDP. In some implementations, two or more communications transmitted for the purpose of determining the first IP address can use different protocols from each other. In an example, the data packet and the response data packet use UDP, and the communication that includes the terminal IP address uses HTTP (for example, the terminal IP address is encoded in an HTTP message that is being sent from the terminal device to the network-side device). In an example, the request message includes a (HTTP), the computer code includes JavaScript code, the communication connection includes a (WebRTC) connection, and at least one of the data packet and the response data packet includes UDP.

In some implementations, a second IP address associated with the terminal device is determined based on a request message (for example, the request message that requests a service). The second IP address can be included in the request message. For example, the second IP address may be included in a header of the request message, or may be included as an IP address of the source of the request message.

In some implementations, the first IP address and the second IP address are used for risk control purposes. In one example, the first IP address is compared to the second IP address to determine a risk level associated with the terminal device. In some examples, if the first IP address is the same as the second IP address, the terminal device is considered safe and the first (or the second) IP address is considered to be an authentic IP address of the terminal device. In some examples, the first IP address is considered as an authentic IP address of the terminal device and if the second IP address differs from the first IP address, the terminal device is considered risky. A risky terminal device can be distinguished from a safe terminal device by a mark, an alarm, or by putting them in different categories. For example, an alarm can be assigned to a risky terminal device (for example, the first IP address of the terminal device) so that the future communications (for example, requests, uploads, or downloads) with the terminal device are monitored, or analyzed. In some examples, when a terminal device is categorized as risky, communications to and from the terminal device are recorded (for example, as a history of the terminal device).

Implementations of the present disclosure are to solve technical problems in determining authentic IP addresses of terminal devices. Traditionally, an IP address of a terminal device is determined based on the data in a header of a message (for example, an HTTP message) received from the terminal device. However, when a terminal is connected to the internet through a secondary device (for example, a router or a proxy server), the IP address in the header may be changed to the IP address of the secondary device. Further, a user can change or hide the terminal device's IP address by using a browser plug-in or a proxy server. What is needed is a technique to bypass these problems in the conventional methods, and determine the authentic IP address of terminal devices.

Implementations of the present disclosure provide methods and apparatuses for improving network security by determining authentic IP addresses of terminal devices. According to these implementations, when a terminal device requests a service (for example, access to a website) from a server, the request is received at a network-side device (for example, a server, or a gateway of a server). In response, the network-side device sends a webpage including computer code to the terminal. The webpage can be based on the requested service (for example, the same webpage that was requested). The computer code runs on the terminal device and causes the terminal device to send a request to establish a communication connection to the network-side device. Once the communication connection between the terminal and the network-side devices is established, the authentic IP address of the terminal device is determined based on one or more communications transmitted over the communication connection.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for Internet Protocol (IP) address acquisition, comprising:
   receiving, by one or more processors, a request message from a terminal device, the request message requesting a service;
   transmitting, by the one or more processors, computer code to the terminal device;
   receiving, by the one or more processors, a communication connection request from the terminal device, the communication connection request being sent from the terminal device in response to running the computer code on the terminal device;
   in response to receiving the communication connection request, establishing, by the one or more processors, a communication connection to the terminal device; and
   determining, by the one or more processors, a first IP address associated with the terminal device based on one or more communications transmitted through the communication connection, wherein determining the first IP address comprises:
      receiving, by the one or more processors, a data packet from the terminal device through the communication connection, the data packet being sent based on the computer code,
      determining, by the one or more processors, a source IP address based on the data packet,
      sending, by the one or more processors, a response data packet to the terminal device through the communication connection, the response data packet including the source IP address, and
      determining, by the one or more processors, the first IP address based on a terminal IP address received from the terminal device, the terminal IP address being determined based on the source IP address.

2. The computer-implemented method of claim 1, wherein the first IP address is the terminal IP address.

3. The computer-implemented method of claim 1, wherein the request message is of Hypertext Transfer Protocol (HTTP), the computer code comprises JavaScript code, the communication connection comprises a Web Real-Time Communication (WebRTC) connection, and at least one of the data packet and the response data packet is of User Datagram Protocol (UDP).

4. The computer-implemented method of claim 1, further comprising:
   determining, by the one or more processors, a second IP address associated with the terminal device based on the request message; and
   performing one or more risk control processes based on the first IP address and the second IP address.

5. The computer-implemented method of claim 4, wherein the one or more risk control processes comprises determining that the first IP address differs from the second IP address, and in response, assigning an alarm to the terminal device to monitor subsequent communications with the terminal device.

6. The computer-implemented method of claim 1, wherein the request message is of a first protocol, and the one or more communications transmitted through the communication connection are of a second protocol, the second protocol being different from the first protocol.

7. A non-transitory, computer-readable medium storing one or more instructions executable by a computer system to cause one or more processors to perform operations comprising:
   receiving a request message from a terminal device, the request message requesting a service;
   transmitting computer code to the terminal device;
   receiving a communication connection request from the terminal device, the communication connection request being sent from the terminal device in response to running the computer code on the terminal device;
   in response to receiving the communication connection request, establishing a communication connection to the terminal device; and
   determining a first IP address associated with the terminal device based on one or more communications transmitted through the communication connection, wherein determining the first IP address comprises:
      receiving a data packet from the terminal device through the communication connection, the data packet being sent based on the computer code;
      determining a source IP address based on the data packet;
      sending a response data packet to the terminal device through the communication connection, the response data packet including the source IP address; and
      determining the first IP address based on a terminal IP address received from the terminal device, the terminal IP address being determined based on the source IP address.

8. The non-transitory, computer-readable medium of claim 7, wherein the first IP address is the terminal IP address.

9. The non-transitory, computer-readable medium of claim 7, wherein the request message is of Hypertext Transfer Protocol (HTTP), the computer code comprises JavaScript code, the communication connection comprises a Web Real-Time Communication (WebRTC) connection, and at least one of the data packet and the response data packet is of User Datagram Protocol (UDP).

10. The non-transitory, computer-readable medium of claim 7, further comprising one or more instructions to:

determine, by the one or more processors, a second IP address associated with the terminal device based on the request message; and perform one or more risk control processes based on the first IP address and the second IP address.

11. The non-transitory, computer-readable medium of claim 10, wherein the one or more risk control processes comprises determining that the first IP address differs from the second IP address, and in response, assigning an alarm to the terminal device to monitor subsequent communications with the terminal device.

12. The non-transitory, computer-readable medium of claim 7, wherein the request message is of a first protocol, and the one or more communications transmitted through the communication connection are of a second protocol, the second protocol being different from the first protocol.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a request message from a terminal device, the request message requesting a service;
transmitting computer code to the terminal device;
receiving a communication connection request from the terminal device, the communication connection request being sent from the terminal device in response to running the computer code on the terminal device;
in response to receiving the communication connection request, establishing a communication connection to the terminal device; and
determining a first IP address associated with the terminal device based on one or more communications transmitted through the communication connection, wherein determining the first IP address comprises:
receiving a data packet from the terminal device through the communication connection, the data packet being sent based on the computer code;
determining, by the one or more processors, a source IP address based on the data packet;
sending, by the one or more processors, a response data packet to the terminal device through the communication connection, the response data packet including the source IP address; and
determining, by the one or more processors, the first IP address based on a terminal IP address received from the terminal device, the terminal IP address being determined based on the source IP address.

14. The computer-implemented system of claim 13, wherein the first IP address is the terminal IP address.

15. The computer-implemented system of claim 13, wherein the request message is of Hypertext Transfer Protocol (HTTP), the computer code comprises JavaScript code, the communication connection comprises a Web Real-Time Communication (WebRTC) connection, and at least one of the data packet and the response data packet is of User Datagram Protocol (UDP).

16. The computer-implemented system of claim 13, further comprising one or more operations to:
determine, by the one or more processors, a second IP address associated with the terminal device based on the request message; and
perform one or more risk control processes based on the first IP address and the second IP address.

17. The computer-implemented system of claim 16, wherein the one or more risk control processes comprises determining that the first IP address differs from the second IP address, and in response, assigning an alarm to the terminal device to monitor subsequent communications with the terminal device.

* * * * *